(12) United States Patent
Siddiqui

(10) Patent No.: US 8,819,019 B2
(45) Date of Patent: Aug. 26, 2014

(54) SYSTEMS AND METHODS FOR ROBUST PATTERN CLASSIFICATION

(75) Inventor: Hasib Ahmed Siddiqui, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 163 days.

(21) Appl. No.: 13/275,248

(22) Filed: Oct. 17, 2011

(65) Prior Publication Data

US 2012/0131006 A1 May 24, 2012

Related U.S. Application Data

(60) Provisional application No. 61/415,228, filed on Nov. 18, 2010.

(51) Int. Cl.
*G06F 17/30* (2006.01)

(52) U.S. Cl.
USPC .......................................... 707/737; 382/224

(58) Field of Classification Search
CPC ................. G06F 17/3071; G06F 17/30864
USPC ............................. 382/155, 224; 707/769, 737
See application file for complete search history.

(56) References Cited

U.S. PATENT DOCUMENTS

| | | | |
|---|---|---|---|
| 5,164,992 A * | 11/1992 | Turk et al. | 382/118 |
| 7,010,167 B1 | 3/2006 | Ordowski et al. | |
| 2007/0122041 A1* | 5/2007 | Moghaddam et al. | 382/224 |
| 2008/0025596 A1* | 1/2008 | Podilchuk | 382/155 |
| 2009/0297048 A1* | 12/2009 | Slotine et al. | 382/224 |
| 2010/0185659 A1* | 7/2010 | Bai et al. | 707/769 |
| 2013/0018922 A1* | 1/2013 | Schmidt et al. | 707/797 |

OTHER PUBLICATIONS

Bachega, et al. 2010. Hypothesis testing in high-dimensional space with the Sparse Matrix Transform. *IEEE Sensor Array and Multichannel Signal Processing Workshop*, pp. 181-184.

Bachega, et al. 2010. Fast signal analysis and decomposition on graphs using the Sparse Matrix Transform. *IEEE, ICASSP*, pp. 5426-5429.

Fukunaga, "Introduction to Statistical Pattern Recognition (second edition)", 1990, Chapter 10, pp. 441-459, Academic Press, XP002669123.

Theiler et al., "Sparse matrix transform for fast projection to reduced dimension", IEEE International Geoscience and Remote Sensing Symposium (IGARSS), Jul. 25, 2010, pp. 4362-4365, IEEE, XP031813971, ISBN: 978-1-4244-9565-8, DOI: 10.1109/IGARSS.2010.5652544.

International Search Report and Written Opinion—PCT/US2011/056759—ISA/EPO—Feb. 20, 2012.

Bachega, et al. Classification of High-Dimensional Data Using the Sparse Matrix Transform. *Proceedings of 2010 IEEE 17th International Conference on Image Processing*, pp. 265-268. Sep. 26-29, 2010.

(Continued)

*Primary Examiner* — James Trujillo
*Assistant Examiner* — Thong Vu
(74) *Attorney, Agent, or Firm* — Knobbe, Martens, Olson & Bear LLP

(57) ABSTRACT

Certain embodiments relate to systems and methods for performing data discrimination using dimensionality reduction techniques. Particularly the Sparse Matrix Transform (SMT) is applied to more efficiently determine the Fischer Discrimination vector for a given dataset. Adjustments to the SMT facilitate more robust identification of the Fischer Discrimination vector in view of various resource constraints.

23 Claims, 13 Drawing Sheets

(56) References Cited

OTHER PUBLICATIONS

Cao, et al. Dec. 2008. Covariance Estimation for High Dimensional Data Vectors Using the Sparse Matrix Transform. *Proceedings of Neural Information Processing Systems Conference.*

Cao, et al. 2011. The Sparse Matrix Transform for Covariance Estimation and Analysis of High Dimensionsl Signals. *IEEE Transactions on Image Processing*, 20(3):625-640.

Dundar, et al. 2005. Sparse Fisher Discriminant Analysis for Computer Aided Detection. *SIAM International Data Mining Conference (SDM '05)*, Newport Beach, CA, USA.

Guo, et al. 2003. A generalized Foley-Sammon transform based on generalized fisher discriminant criterion and its application to face recognition. *Pattern Recognition Letters*, 24:147-158.

Tibshirani, R. 1996. Regression Shrinkage and Selection via the Lasso. *Journal of the Royal Statistical Society*, 58(1):267-288.

Xu, et al. Oct. 21-23, 2010. Feature Selection Based on Sparse Fisher Discriminant Analysis. *2010 Chinese Conference on Pattern Recognition (CCPR)*, p. 1-5.

Inoue, Kohei et al., "Speed-up of Image Classification and Image Retrieval Based on Sparse Singular Value Decomposition," Technical Report of the Institute of Electronics, Information and Communication Engineers (IEICE), IE2002-24 to 29, Image Engineering, IEICE, Jun. 21, 2002, vol. 102, No. 152, pp. 1-6. [Abstract Only].

Yamaguchi, Takayasu et al., "Discrimination of signboard pictures using a mobile camera," Technical Report of the Institute of Electronics, Information and Communication Engineers (IEICE), PRMU2004-105 to 122, Pattern Recognition and Media Comprehension, IEICE, Nov. 12, 2004, vol. 104, No. 448, pp. 7-12. [Abstract Only].

\* cited by examiner

400

$a \leftarrow 0, b \leftarrow 1$ —— 401 for $1 \leq k \leq K$ do —— 402

$\lambda^{(k)} \leftarrow \dfrac{a+b}{2}$ —— 403

$\varphi^{(k)} \leftarrow \mathbf{e}_0^{\lambda^{(k)}}$ —— 404

$f(\lambda^{(k)}) \leftarrow d_0^{\lambda^{(k)}}$ —— 405 if $d_0^{\lambda^{(k)}} > 0$ then —— 406

$a \leftarrow \lambda^{(k)}$ —— 407 else —— 408

$b \leftarrow \lambda^{(k)}$ —— 409 end if —— 410 end for —— 411

$\lambda_F^* \leftarrow \lambda^{(K)}, \varphi_F^* \leftarrow \varphi^{(K)}$ —— 412

$$S^{(0)} = S \quad\quad\quad \text{—— 501}$$

$$\text{for } 0 \leq m \leq r-1 \text{ do} \quad\quad \text{—— 502}$$

$$(i_m, j_m) \leftarrow \arg\max_{(i,j)} \frac{S^{(m)2}_{i,j}}{|S^{(m)}_{i,i}||S^{(m)}_{j,j}|} \quad\quad \text{—— 503}$$

$$\theta_m \leftarrow \frac{1}{2} \arctan\left(-2 S^{(m)}_{i_m,j_m}, S^{(m)}_{i_m,i_m} - S^{(m)}_{j_m,j_m}\right) \quad\quad \text{—— 504}$$

$$T^{(m)} = T(i_m, j_m, \theta_m) \quad\quad \text{—— 505}$$

$$S^{(m+1)} = T^{(m)T} S^{(m)} T^{(m)} \quad\quad \text{—— 506}$$

$$\text{end for} \quad\quad \text{—— 507}$$

$$E^r = \prod_{m=0}^{r-1} T^{(m)} \quad\quad \text{—— 508}$$

$$D^r = \text{diag}\left(E^{rT} S E^r\right) \quad\quad \text{—— 509}$$

FIG. 5
(Prior Art)

$$\mathbf{T}^{(m)} = T(i_m, j_m, \theta_m)$$

$$\equiv \begin{bmatrix} 1 & & \cdots & & & 0 \\ & \ddots & & & & \\ & & \cos\theta_m & & -\sin\theta_m & & i_m \\ \vdots & & & \ddots & & & \vdots \\ & & \sin\theta_m & & \cos\theta_m & & j_m \\ & & & & & \ddots & \\ 0 & & \cdots & & & 1 \\ & & i_m & & j_m & & \end{bmatrix}$$

FIG. 6
(Prior Art)

$a \leftarrow 0, b \leftarrow 1$ — 801 for $1 \leq k \leq K$ do — 802

$\lambda^{(k)} \leftarrow \dfrac{a+b}{2}$ — 803

$\varphi^{(k)} \leftarrow \mathbf{e}_0^{r,\lambda^{(k)}}$ — 804

$f^r(\lambda^{(k)}) \leftarrow d_0^{r,\lambda^{(k)}}$ — 805 if $d_0^{r,\lambda^{(k)}} > 0$ then — 806

$a \leftarrow \lambda^{(k)}$ — 807 else — 808

$b \leftarrow \lambda^{(k)}$ — 809 end if — 810 end for — 811

$\lambda_F^{*r} \leftarrow \lambda^{(K)}, \varphi_F^{*r} \leftarrow \varphi^{(K)}$ — 812

FIG. 8

SYSTEMS AND METHODS FOR ROBUST PATTERN CLASSIFICATION

CROSS-REFERENCE TO RELATED APPLICATIONS

This application claims the benefit under 35 U.S.C. Section 119(e) of co-pending U.S. Provisional Patent Application Ser. No. 61/415,228, filed on Nov. 18, 2010, by Hasib Siddiqui, entitled "Sparse Fisher Linear Discriminant Analysis" which application is incorporated by reference herein.

TECHNICAL FIELD

The systems and methods disclosed herein relate generally to more efficient data classification for a plurality of different forms of physical sensor data.

BACKGROUND OF THE INVENTION

Modern computer systems increasingly rely on data processing techniques for rapid training and accurate identification and classification of datasets. These datasets may be sparse and over-constrained. For example, a radio communications receiver may receive only a few messages comprising data with many dimensions. Such a situation is referred to as being "overconstrained" since the system must infer a general characteristic based on only a few, very complex, samples. Despite this difficulty, the receiver must classify message patterns to accurately distinguish errors from authentic messages.

Various tools may be used to reformulate data into a form more amenable to analysis and data classification. Fisher's linear discriminant analysis (LDA) is one method for distinguishing classes of data within a dataset. Traditionally, LDA may be used in statistics and pattern recognition to linearly project high-dimensional observations from two or more classes onto a low-dimensional feature space before classification. By projecting data onto a lower dimensional feature space it may be easier to classify incoming data than if classification were attempted on the higher dimensional space. Furthermore, operating in a lower dimensional feature space may facilitate more efficient classification than in the original space.

Development of the Fisher Method

FIG. 1 depicts two data classifiers, 101a and 101b. Data falling within these classifiers may comprise audio data, video data, image data, or any dataset upon which classification may be performed. The classifiers may be generated from a plurality of "training" datapoints fed into the system, i.e. data with a corresponding classification already provided. A new data point, i.e. a "test" or "live" datapoint, whose values fall within the classifier 101a would be classified as data of the type corresponding to the classifier 201a. Similarly, a new data point whose values fall within the classifier 101b will be classified is data of the type corresponding to the classifier 101b. Here, the data comprises only two dimensions 102a, 102b, for ease of explanation, though one will readily recognize that data may regularly be represented in many more dimensions.

While one could simply identify the appropriate classification for a set of new data points by referring to the default coordinates of 102a, 102b, it is regularly the case that these default coordinates are not necessarily the best coordinates in which to represent the data to perform classification. Instead, another unidentified coordinate system may be more amenable to rapid classification. Furthermore, it may be preferable to use fewer dimensions when performing classification, as certain of the default dimensions 102a, 102b may be less useful for classification than other of the default dimensions (as mentioned above, not all 1600 pixels of an image are likely equally useful for facial classification). Identifying a smaller number of dimensions within which to perform classification is sometimes referred to as "dimensionality reduction".

Once a new set of coordinates (103a, 103b) has been identified, the classifiers and these incoming data points may then be projected upon these new coordinates to facilitate data classification. In the example of FIG. 1, rather than consider the two dimensions 102a and 102b, one could instead project the classifiers and new incoming data upon the vector 103b. Classification could then be performed by noting the new data point's projected location upon the vector 103b. In this example, the distributions of classifiers 201a and 201b comprise means $\mu_1$ and $\mu_2$ respectively when projected along the vector $\phi$ 203b.

One method for identifying the vector 103b is the Fisher Discrimination method which relies upon the Fisher Discrimination Criterion. The Fisher Discrimination Criterion relates the between-class variation ($S_b$) to the within-class variation ($S_w$) of the classifiers, as projected upon a candidate vector 103b. One may also refer to the total scatter $S_t$ as $S_w+S_b$. The between-class scatter $S_b$ may be defined as:

$$S_b = (\mu_1-\mu_2)(\mu_1-\mu_2)^T \in R^{N \times N} \quad (1)$$

In this example, the within class scatter may be defined as $$S_w = S_1+S_2 \in R^{N \times N} \quad (2)$$

and the total scatter may be defined as $$S_t = S_b+S_w \in R^{N \times N} \quad (3)$$

Intuitively, projected classifiers with high between-class variation and low within-class variation will facilitate better datapoint segregation than the converse. This is reflected in the Fischer Criterion which is defined as:

$$\frac{\phi^T S_b \phi}{\phi^T S_w \phi} \quad (4)$$

A high between-class variation ($S_b$) and a low within-class variation ($S_w$) will have a higher Fischer Criterion and will better facilitate classification. This criterion may be used to identify, of all the possible vectors in the space of coordinates 102a, 102b, the vector $\phi$ 103b which best segregates the classifiers 101a, and 101b. Some methods first identify the vector transpose $\phi_0$ 103a, but the general concept is the same, as would be recognized by one in the art. Although in the simplified example of FIG. 1 one may readily determine that the vector $\phi$ 203b best segregates classifiers 101a and 101b, in a many-dimensional system with complicated classifiers the proper vector may be much more difficult to determine Thus, the Fisher Criterion provides a valuable metric for assessing a candidate vector's merit for improving classification.

The vector $\phi$ 103a may be identified by iterating through possible vectors in the space of 102a, 102b, and finding the vector which maximizes the Fisher Criterion for the classifiers. This "maximum vector" $\phi^*_F$ may be represented as $$\phi^*_F = \underset{\phi \in R^N}{\operatorname{argmax}} \frac{\varphi^T S_b \varphi}{\varphi^T S_t \varphi}; \tag{5}$$

One may determine $\phi^*_F$ by alternatively computing the maximization of an equivalent criterion $\lambda_F$.

$$\lambda_F(\varphi) = \operatorname{argmax} \frac{\varphi^T S_b \varphi}{\varphi^T S_t \varphi}; \; 0 \le \lambda_F(\varphi) \le 1. \tag{6}$$

For the sake of simplicity, the total scatter $S_t$ is used, so that the values of $\lambda_F$ fall within the range of 0 to 1. $\lambda_F$ is referred to as the Fisher's Linear Discrimination Criterion (FLDC).

It can be shown that a vector $\phi$ that maximizes the FLDC must satisfy (a proof is provided in the attached appendix):

$$S_b \phi = \lambda S_t \phi, \tag{7}$$

for some constant $\lambda$. This is a generalized eigenvalue decomposition problem.

When $S_b$ and $S_t$ are both N×N symmetric matrices, there are N pairs of eigenvalues and eigenvectors that satisfy (7): $(\lambda_0, \phi_0), \ldots, (\lambda_{N-1}, \phi_{N-1})$. The eigenvalues $\lambda_0, \ldots, \lambda_{N-1}$ are all real and, when $S_b$ and $S_t$ are scatter matrices lying in the range from 0 to 1. Without loss of generality, assume $\lambda_0 \ge \ldots \ge \lambda_{N-1}$. Since $S_b$ is a rank-one matrix, it can additionally be inferred that only one of the N eigenvalues $\lambda_f$ is non-zero.

$$0 < \lambda_0 < 1 \text{ and } \lambda_0, \ldots, \lambda_{N-1} = 0 \tag{8}$$

Thus, the Fisher's Linear Discriminant Vector is the generalized eigenvector, $\phi_0$, corresponding to the only non-zero generalized eigenvalue, $\lambda_0$, of $S_b$ and $S_t$:

$$\phi^*_F = \phi_0 \tag{9}$$

$$\lambda_F = \lambda_0 = \operatorname{argmax} \frac{\varphi_0^T S_b \varphi_0}{\varphi_0^T S_t \varphi_0}; \tag{10}$$

The following is one proposed method for identifying $\lambda_0$. From (7), consider performing a classical eignevale decomposition of $(S_b - \lambda S_t)$ for a fixed $\lambda$. Let $E\lambda = [e_0^\lambda, \ldots, e_{N-1}^\lambda]$ and $D\lambda = \operatorname{diag} [d_0^\lambda, \ldots, d_0^\lambda, \ldots, d_{N-1}^\lambda]$, respectively denote the eigenvector and eigenvalue matrices of $(S_b - \lambda S_t)$. The eigenvalue decomposition can be written as $$D^\lambda = E^{\lambda,T}(S_b - \lambda S_t)E^\lambda \tag{11}$$

An eigenvalue $d_0^\lambda$ is related to its eigenvector $d_0^\lambda$ by $D^\lambda = E^{\lambda,T}(Sb - \lambda St)E^\lambda$. Without loss of generality, assume $[d_0^\lambda, \ldots, d_{N-1}^\lambda]$.

Thus, the optimal value of the Fisher's Discriminant criterion, may be computed as a value of $0 < \lambda < 1$ that makes $(S_b - \lambda S_t)$ semi-negative definite. It can be shown that there exists only one unique value of $\lambda$ in the range [0,1] that satisfies the above condition (proof is provided in the Appendix). Therefore, if we let $f(\lambda):[0,1] \to R$ represent the largest eigenvalue of $(S_b - \lambda S_t)$ as a function of $\lambda$, i.e.

$$f(\lambda) \equiv \max_{\varphi: \|\phi\|=1} \phi^T(S_b - \lambda S_t)E^\lambda \tag{12}$$

$$= e_0^{\lambda,T}(Sb - \lambda St)e_0^\lambda \tag{13}$$

$$= d_0^\lambda \tag{14}$$

The optimal value of the Fisher's criterion, $\lambda^*_F$, may then be computed as $$= e_0^{\lambda,T}(S_b - \lambda S_t)e_0^\lambda \tag{15}$$

The Fisher's discriminant vector $\phi^*_F$ may then be given by $$\phi^*_F = e^{\lambda^* F} \tag{16}$$

The function $f(\lambda)$: is bounded on [0,1] and satisfies the following properties on the closed interval.

$$\lambda < \lambda^*_F \Leftrightarrow f(\lambda) > 0 \tag{17}$$

$$\lambda > \lambda^*_F \Leftrightarrow f(\lambda) = 0 \tag{18}$$

$$\lambda = \lambda^*_F \Leftrightarrow f(\lambda) = 0 \tag{19}$$

Generalized Summary of the Fisher Discrimination Analysis

While the preceding section and attached appendices are intended to provide a thorough treatment of the Fisher Discrimination Analysis methodology as used in certain embodiments, FIG. 2 provides a more generalized overview of this reasoning for ease of comprehension. Particularly, FIG. 2 summarizes the analysis producing the function $f(\lambda)$ and the corresponding search algorithm which will be improved upon by certain embodiments discussed in greater detail below.

As discussed above, the analysis begins 201 by recognizing that we would like to use the Fisher criterion to determine an appropriate projection vector $\phi^*_F$ 202. Determining $\phi^*_F$ requires that we find the maximum argument of $$\frac{\varphi^T S_b \varphi}{\varphi^T S_t \varphi} \tag{20}$$

This may be rewritten as an eigenvalue decomposition problem 203. By the proof provided in Appendix B, it may then be shown that the optimal value of the Fisher's Discriminant criterion can be computed by finding a value between 0 and 1 that makes $(S_b - \lambda S_t)$ semi-negative definite. Fortuitously, there is only one value in that range which will make $(S_b - \lambda S_t)$ semi-negative definite. From these conditions we may define the function 304.

$$f(\lambda) \equiv \max_{\varphi: \|\phi\|=1} \phi^T(S_b - \lambda S_t)E^\lambda \tag{21}$$

$$= e_0^{\lambda,T}(S_b - \lambda S_t)e_0^\lambda \tag{22}$$

This function has various properties 205. In view of these properties, we recognize that we may find $\lambda^*$ by iterating through possible value of $\lambda$, and plugging them into the equation 204, until we identify a value of $\lambda$ which produces an $f(\lambda)$ of 0. This $\lambda$ will be $\lambda^*$, which we may then use in conjunction with the equation (21) to determine the projection vector $\phi_F^*$, which we had originally sought.

The following section discusses one possible algorithm for finding $\lambda^*$ from the equation $f(\lambda)$ 204.

Algorithmic Search for $\lambda^*$ Using the Function $f(\lambda)$

Referring to the conditions 205 of FIG. 2, the $\lambda$ which is $\lambda^*$ may be found by a bisection search algorithm. That is, if $\lambda$ is too low (condition #1) then f(λ) will be too high. Thus a larger value of λ must be selected. However, if too large a value of λ is selected, then f(λ) will be negative (condition #2). One could iterate, selecting successively more granular deltas, until a satisfactorily low value of f(λ) were achieved. In this manner, λ may be made as close to λ* as desired.

FIG. 3 is plot of a function f(λ) representing the largest eigenvalue of $(S_b - \lambda S_t)$ as a function of λ. As indicated, the function takes on values of λ 301 along the range from 0 to 1. In this particular example, the function passes through 0 at the value of 0.35. As discussed above, the λ that produces this zero value is the λ* 305 which we seek. Thus, in this example, λ* is 0.35. As the shape of the function f is known it is possible to iteratively search for the value of λ which sets f(λ) to zero. For example, one could begin at 0.5 and calculate the value of f(λ) by solving the equation 204. If f(λ) 302 is less than zero (as is the case at 0.5 in this example), one could then select a value smaller than the previously selected value, say, 0.25. Calculating f(λ) for λ=0.25 generates a positive f(λ) 302 and so one may then select a value to the right of the previous value, 0.25, but before the first selected value, 0.5. Thus, one might select λ=0.375, which would generate a slightly negative f(λ). The process may continue, ad infinum, or until a desired level of precision is reached.

FIG. 4 is a generalized algorithm of this process, i.e., iteratively driving the largest eigenvalue of $(S_b - \lambda S_t)$ to zero using bisection. Line 401 initializes variables a and b which represent the smallest and largest values respectively of the λ range to be considered. For as many iterations K as desired 402, the system then iterates in search of λ*. A candidate λ is determined by averaging the values 403. A corresponding eigenvector 404 may be noted. The system may then calculate f(λ) 405. As indicate above, it may require considerable computational resources to perform this calculation. Calculating f(λ) iteratively may impose too great a burden for some systems. If f(λ) is greater than zero 406, the system assigns 407 the selected 2, as the smallest value in the range to consider before continuing the iterations. If f(λ) is negative 408 then the range is instead updated by assigning the candidate value as the largest value in the range to be considered 409. When K iterations are reached, the system assigns 412 the $K^{th}$ eigenvalue and eigenvector for output. One will readily recognize many modifications to this example exist in the art.

Search algorithms such as the bisection search of FIG. 4 pertaining to the Fisher Discrimination embodiment are common to many classification problems. In many of these problems a metric function, such as f(λ), must be repeatedly calculated. This metric function may comprise eigenvector and eigenvalues which must be rapidly calculated, or else the iterations will take far too long to complete.

Unfortunately, as the computational complexity of linear feature extraction increases linearly with dimensionality of the observation samples, computation can become intractable for high dimensional data, particularly where the operation is to be performed in real time. As mobile devices and portable computers become more prevalent, there is an increasing need for more efficient and robust classification systems. In particular, the calculation of the metric f(λ) as part of the search algorithm for λ* discussed above is computationally intensive and represents a barrier to more efficient training.

SUMMARY OF THE INVENTION

Certain embodiments contemplate a method, implemented on an electronic device, for generating physical sensor data classifiers, the method comprising: receiving a plurality of physical sensor data; identifying a projection vector based on the physical sensor data using a search algorithm, the search algorithm comprising a metric function, wherein identifying a projection vector comprises calculating one or more eigenvalues associated with the metric function using a sparse matrix transform; and producing physical sensor data classifiers by projecting at least a portion of the physical sensor data upon the projection vector.

In some embodiments, the physical sensor data comprises one of facial image data, speech audio data, wireless communication signals, or laser range-finder data. In some embodiments, the search algorithm is iteratively calculated. In some embodiments, the metric function comprises the Fisher Discriminant In some embodiments, the search algorithm comprises a bijective search.

Certain embodiments contemplate a mobile electronic device comprising: a memory, the memory configured to store a data set comprising physical sensor data; a processor configured to: receive a plurality of physical sensor data; identify a projection vector based on the physical sensor data using a search algorithm, the search algorithm comprising a metric function, wherein identifying a projection vector comprises calculating one or more eigenvalues associated with the metric function using a sparse matrix transform; and produce physical sensor data classifiers by projecting at least a portion of the physical sensor data upon the projection vector.

In some embodiments, the physical sensor data comprises one of facial image data, speech audio data, wireless communication signals, or laser range-finder data. In some embodiments, the search algorithm is iteratively calculated. In some embodiments, the metric function comprises the Fisher Discriminant. In some embodiments, the search algorithm comprises a bijective search.

Certain embodiments contemplate a non-transitory, computer-readable medium, comprising instructions configured to cause a processor to implement a method to classify physical sensor data, the method comprising: receiving a plurality of physical sensor data; identifying a projection vector based on the physical sensor data using a search algorithm, the search algorithm comprising a metric function, wherein identifying a projection vector comprises calculating one or more eigenvalues associated with the metric function using a sparse matrix transform; and producing physical sensor data classifiers by projecting at least a portion of the physical sensor data upon the projection vector.

In some embodiments, the physical sensor data comprises one of facial image data, speech audio data, wireless communication signals, or laser range-finder data. In some embodiments, the search algorithm is iteratively calculated. In some embodiments, the metric comprises the Fisher Discriminant In some embodiments, the search algorithm comprises a bijective search.

Certain embodiments contemplate a mobile electronic device comprising: means for receiving a plurality of physical sensor data; means for identifying a projection vector based on the physical sensor data using a search algorithm, the search algorithm comprising a metric function, wherein identifying a projection vector comprises calculating one or more eigenvalues associated with the metric function using a sparse matrix transform; and means for producing physical sensor data classifiers by projecting at least a portion of the physical sensor data upon the projection vector.

In some embodiments, the receiving means comprises a processor running software, the identifying means comprises a processor running software, the producing means comprises a processor running software. In some embodiments, the physical sensor data comprises one of facial image data, speech audio data, wireless communication signals, or laser range-finder data. In some embodiments, the search algorithm is iteratively calculated. In some embodiments, the metric function comprises the Fisher Discriminant. In some embodiments, the search algorithm comprises a bijective search.

BRIEF DESCRIPTION OF THE DRAWINGS

FIG. 4 is one possible prior art generalized algorithm for iteratively driving the largest eigenvalue of $(S_b-\lambda S_t)$ towards zero by bisection.

FIG. 5 is a prior art generalized depiction of one possible algorithm for applying the SMT transform to estimate eigenvalues and eigenvectors of a symmetric matrix.

FIG. 6 is a prior art illustration of a symmetric Givens rotation matrix.

FIG. 8 is a generalized algorithm for iteratively driving the largest eigenvalue of $(S_b-\lambda S_t)$ towards zero by bisection incorporating the Sparse Matrix Transform (SMT) methodology as contemplated in certain of the embodiments.

DETAILED DESCRIPTION

Figure 1:
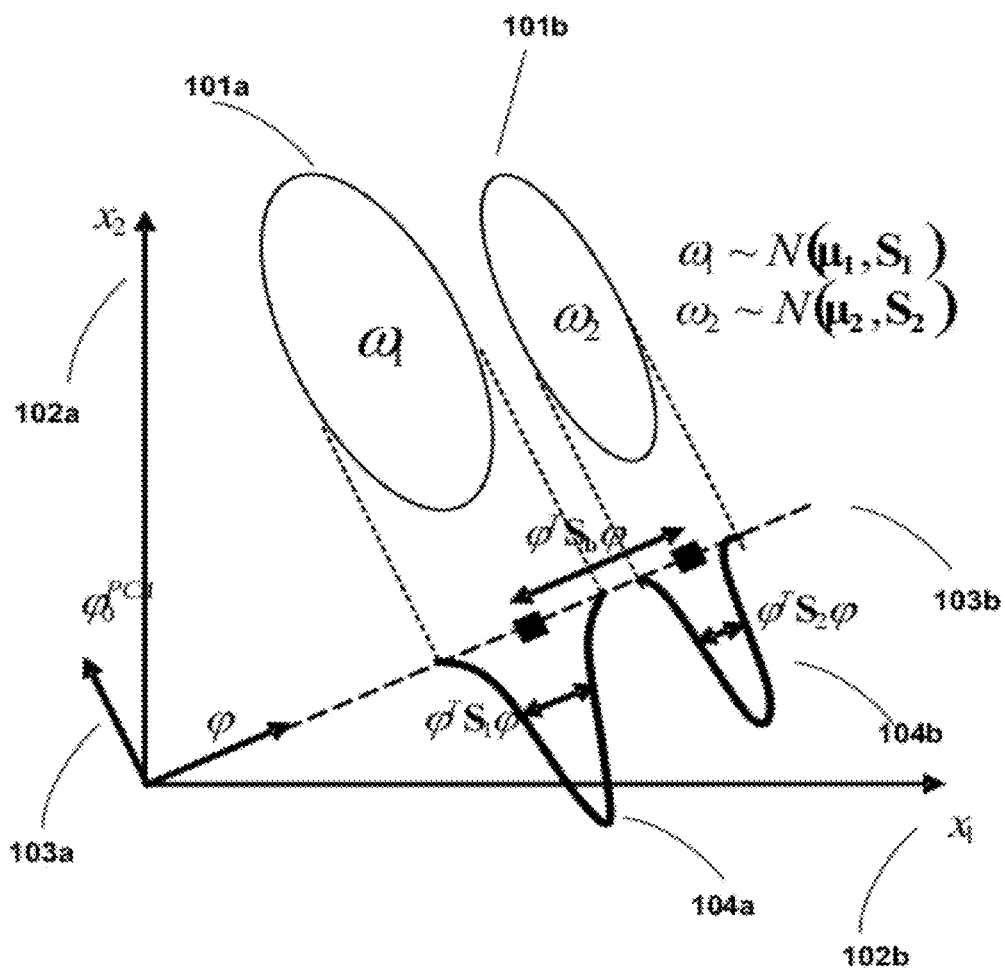
FIG. 1 illustrates a prior art projection of two data classifiers upon a vector which maximizes the Fisher Discriminant criterion between the classifiers.

One embodiment is a system and method for classifying data received by a sensor in an electronic device. In this embodiment, the electronic device includes a rapid data classification process that captures the sensor data, generates an appropriate classifier, and classifies data into one or more classifications. For example, the sensor may be an image sensor, and thus the rapid classification process may be configured to classify images captured by the sensor. In one specific embodiment, the captured image may include one or more faces, and the rapid classification process may be used to identify portions of the captured image that contain a face. In a related embodiment, the captured image may include one or more faces, and the rapid classification process may be used to match faces captured by the image sensor against other pre-stored images in order to retrieve other images of the same person from a data storage. One will readily recognize that any object, not just a face, may employ the classification method of this embodiment.

In certain of these embodiments, the rapid classification system and process may use a modified version of the LDA, termed herein "sparse matrix LDA", wherein a sparse matrix transformation replaces the more typical matrix transform described above for a conventional LDA process. Although LDA is optimized in this embodiment, the optimization may likewise be applied to search algorithms of other classifiers as described in greater detail below. In this embodiment, a discriminant vector in the sparse LDA can be computed as a solution to a constrained optimization problem. This embodiment contemplates optimizing the calculation of a metric function associated with this constrained optimization problem. Particularly, the metric function may be modified to employ a Sparse Matrix Transform (SMT). The SMT may be used to perform a sub-calculation of the metric function, such as the computation of eigenvalues and eigenvectors. The SMT provides a plurality of constraints to control the accuracy of this computation. Particularly, these constraints can be relaxed or made more stringent to control the number of non-zero entries in the optimized discriminant vector. More non-zero entries in the optimized discriminant vector leads to higher dimensionality and computational complexity, whereas fewer non-zero entries leads to lower dimensionality and complexity in the data to be analyzed. By allowing the constraints to be relaxed or to be made more stringent a desired level of computational accuracy may be achieved. Throughout this application, LDA which incorporates the SMT as part of its metric function will be referred to as sparse matrix LDA. The Classical Fisher's LDA becomes a special case of the proposed sparse matrix LDA framework when the constraints in the optimization problem are fully relaxed.

Tightening the constraints leads to sparse features, which can result in lower classification accuracy, but is also computationally much more efficient. The metric that is optimized for computation of sparse matrix features is the same as that used in classical Fisher's LDA. However, the search space is constrained to include only a set of potentially-informative vectors, which are sparse in RN, for discriminating data from different classes. Thus, sparse matrix LDA focuses on the vectors that would be most informative for the target purpose, such as facial recognition, while ignoring vectors that would materially help increase the accuracy of the final classification.

In one embodiment, for generating a pool of candidate sparse discriminant directions, a sparse matrix transform may be used for regularization of covariance estimates of high-dimensional signals. The SMT model estimates an orthonormal transformation as a product of a sequence of pairwise coordinate rotations known as the Givens rotations. The sparsity of the eigen decomposition can be controlled by restricting or increasing the number of Givens rotations in the SMT model. The experimental results show that the sparse discriminant direction searched using the proposed algorithm, in a two-class data set, exhibits a superior discriminatory ability than a classical Fisher's discriminant direction hard-thresholded to retain only a desired number of non-zero elements. The new linear discriminant analysis framework, thus, provides an advantageous compromise between classification accuracy and computational complexity.

While certain of these embodiments are discussed with particular reference to face identification, particularly implemented with LDA, the improved sparse matrix methods disclosed in these embodiments may be applied to any search algorithm comprising a metric function, where the metric function requires successive calculation of eigenvalues or eigenvectors under various resource constraints (time, computational power, etc.). For example, the disclosed embodiments may be readily adapted to other search metric functions computing eigenvalues, such as Principal Component Analysis (PCA) and reformulations of the Fourier Transform.

Figure 2:
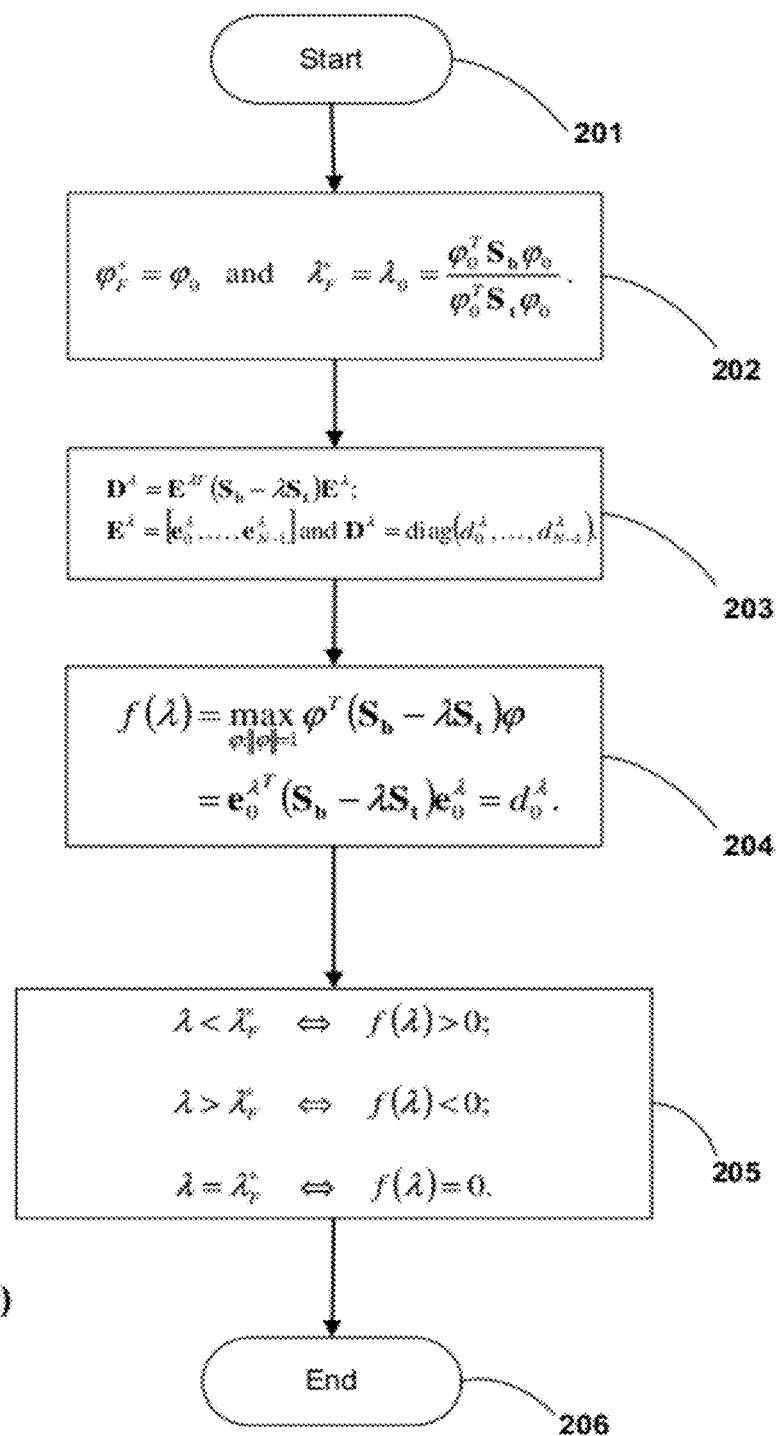
FIG. 2 is a prior art generalized logical flow diagram depicting the analysis pursued for identifying a vector maximizing the Fisher Discriminant criterion.

Traditionally, the Sparse Matrix Transform (SMT) is used with the intention of finding a sparse-regularized solution to a classical eigenvalue problem (or PCA). Such problems are approached with the expectation that SMT may be applied to a single matrix. Applicant has instead recognized that the SMT framework may be extended to find a sparse-regularized solution to a generalized eigenvalue problem comprising two symmetric matrices rather than one (See, e.g., the matrices $S_b$ and $S_t$ of 204 in FIGS. 2 and 804 and 805 in FIG. 8). Applicant has further recognized that this extension may be further applied in the context of dataset classification to more rapidly classify data. As a traditional SMT system approach would apply rotations to one of $S_b$ and $S_t$ individually, traditional SMT would be unsuitable for this problem. Applicant has instead determined a method for applying SMT iteratively to the linear combination of the two matrices $(S_b - \lambda S_t)$. Applicant's recursive method, as described below, makes it unnecessary to apply SMT to the matrices $S_b$, $S_t$ separately, in order to determine leading eigenvalues and eigenvectors. The sparse eigenvector generated using the proposed optimization can be used for fast dimensionality reduction in a data classification algorithm or for variable shrinkage/selection in a high-dimensional linear regression problem as described further below. Applicant's methods may also be used to solve various algorithms, such as regression problems. For example, with reference to LDA, the sparse matrix computation of eigenvalues may be performed using the methods discussed below to determine a projection vector using a factory training set. The factory training set may be generated in anticipation of in-field use by the end-user. The present embodiments will facilitate faster and/or more accurate training of the devices based on the factory training set than was possible previously. These methods may also facilitate faster in-situ classification, training, and re-training for mobile devices operating in the field.

Certain search algorithms improved by the present embodiments may seek a projection vector upon which to project classifiers, such as in LDA, while others may seek to optimize parameters through other known methods, such as using linear programming Generally speaking, any classification algorithm requiring multiple calculations of a set of eigenvalues and eigenvectors, may employ the improvements discussed below.

Figure 3:
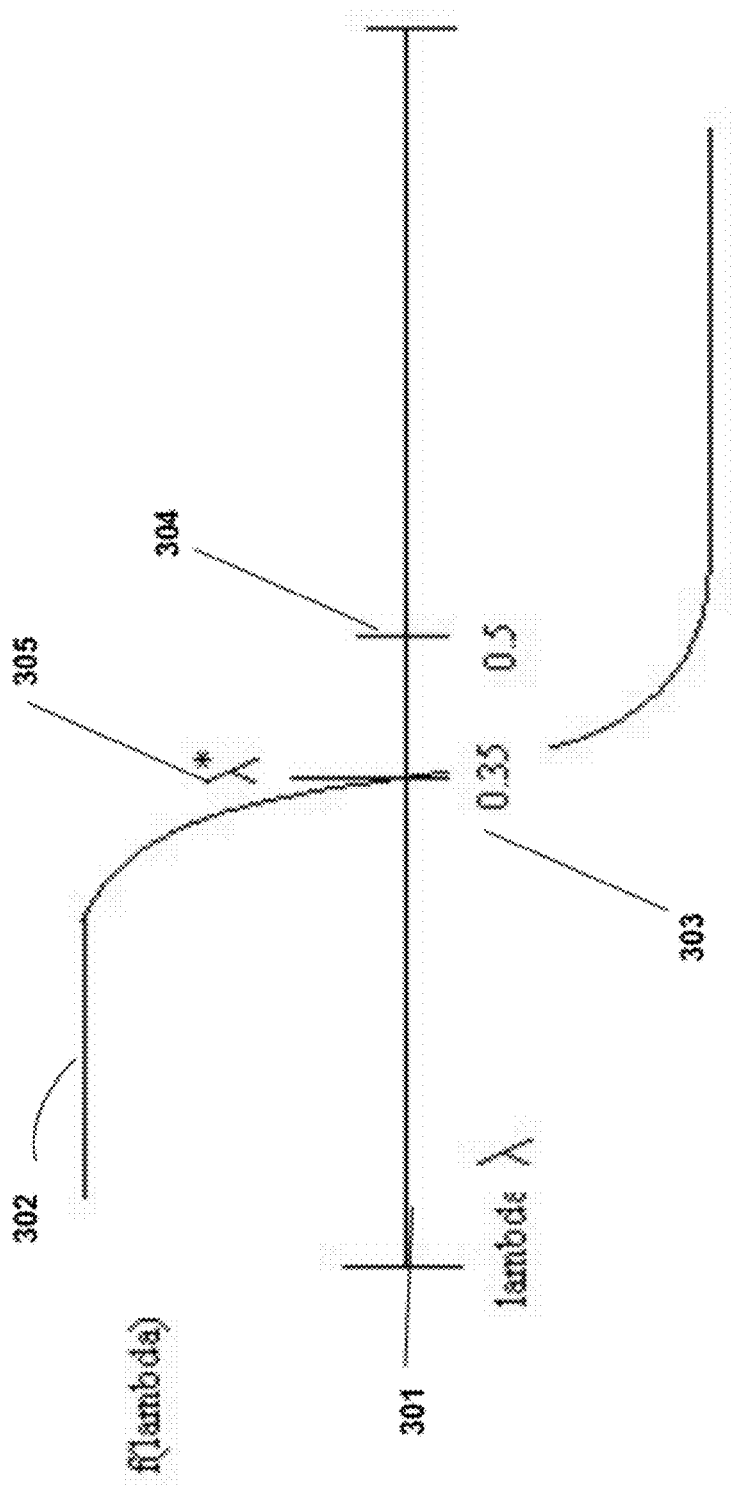
FIG. 3 is a prior art plot of a function $f(\lambda)$ representing the largest eigenvalue of $(S_b-\lambda S_t)$ as a function of $\lambda$.

In the present disclosure, physical sensor data is a broad term and is to be given its ordinary and customary meaning to a person of ordinary skill in the art (ie, it is not to be limited to a special or customized meaning) and includes, without limitation, facial image data, speech audio data, wireless communication signals, laser range-finder data, or any data set derived from a sensor such as a camera, microphone, pressure sensor, and the like. Similarly, in the present disclosure, a projection vector is a broad term and is to be given its ordinary and customary meaning to a person of ordinary skill in the art (ie, it is not to be limited to a special or customized meaning) and includes, without limitation, any data structure within a computer system upon which data is projected, i.e. transformed so as to be described upon a different set of dimensions than the dimensions upon which the data was previously represented. In the present disclosure, search algorithm is a broad term and is to be given its ordinary and customary meaning to a person of ordinary skill in the art (ie, it is not to be limited to a special or customized meaning) and includes, without limitation, any algorithm used to identify a vector or value of interest. For example, the algorithm depicted in FIG. 4 comprises a search algorithm, which seeks to identify a value $\lambda$ approaching the optimal value $\lambda^*$ to a desired degree of accuracy. In the present disclosure, metric function is a broad term and is to be given its ordinary and customary meaning to a person of ordinary skill in the art (ie, it is not to be limited to a special or customized meaning) and includes, without limitation, any function within a computational program by which the degree to which a desired level of accuracy or completion is assessed. For example, the function $f(\lambda)$ representing the largest eigenvalue of $(S_b - \lambda S_t)$ as a function of $\lambda$ depicted in FIG. 3, comprises a metric function. A metric function may itself comprise a plurality of component metrics and one will readily recognize that the term "metric function" may be equally applied to any of these component metrics to the extent they are used to assess the degree to which a desired level of accuracy or completion has been achieved. In the present disclosure, sparse matrix transform is a broad term and is to be given its ordinary and customary meaning to a person of ordinary skill in the art (ie, it is not to be limited to a special or customized meaning) and includes, without limitation, the operations depicted in FIG. 5. One will readily recognize, however, that FIG. 5 has broken the operations of the SMT along arbitrary boundaries and depicts arbitrary representations of the SMT's sub-operations. For example, one skilled in the art would readily recognize that for-loop 502 may be substituted with a while loop and that the individual operations may be reordered and recharacterized while achieving the same end operational effect. Accordingly, reference to the SMT in the present disclosure is with regards to any algorithm achieving the same operational effect as the algorithm depicted in FIG. 5. In the present disclosure, classifiers is a broad term and is to be given its ordinary and customary meaning to a person of ordinary skill in the art (i.e., it is not to be limited to a special or customized meaning) and includes, without limitation, boundaries or domains, such as classifiers 101*a* and 101*b* derived from an annotated set of data. Classifiers may refer the raw imported annotated data, but may also refer to the data in a different representation, such as when classifiers 101*a* and 101*b*, are projected upon projection vector 103*b*.

Figure 7:
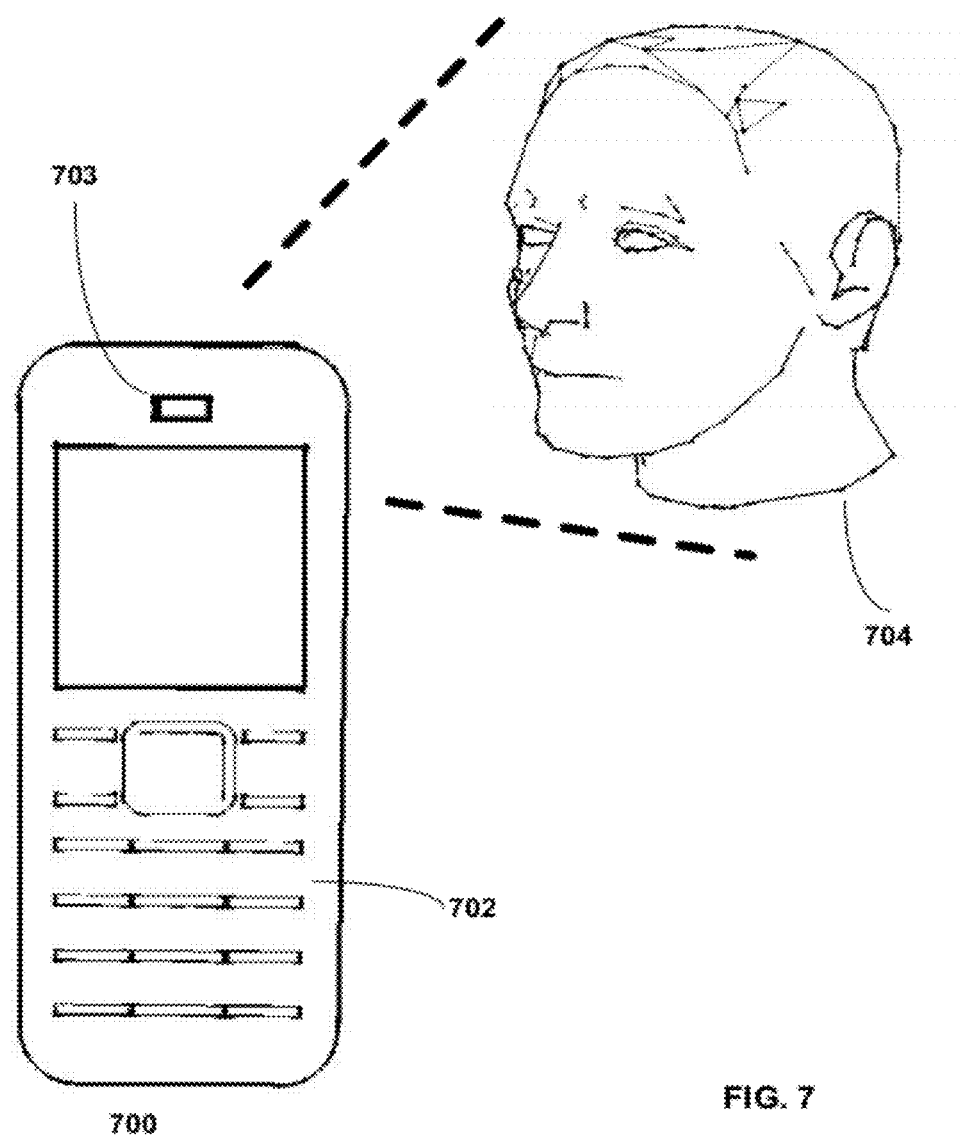
FIG. 7 illustrates a mobile device implementing certain of the embodiments, wherein the mobile device is trained to recognize one or more faces from among a plurality of faces.

FIG. 7 illustrates a mobile device 700 implementing certain of the disclosed embodiments. The mobile device may comprise a plurality of software and hardware configured to recognize patterns in data operated upon by the device. For example, the device may comprise a camera 703, and the mobile device may be trained to recognize one or more faces 704 from a plurality of faces using various classification techniques. As the user incorporates new data into the corpus of training images the system can retrain itself so that the same facial features may be more easily recognized under various lighting conditions and circumstances. Although a camera system, particularly in relation to facial classification, is described in this disclosure for purposes of clarity, one will readily recognize a number of other device components implementing data classification techniques. For example, a wireless reception system, a speech recognition system, and an audio transmission system located on the mobile device 700 may also each employ data classification techniques to classify wireless transmission signals, speech input, and tonal patterns respectively.

Each of these systems may acquire their input as a dataset comprising a number of dimensions. For example, by one interpretation of image data, each image pixel within the image may comprise a separate dimension of the data, with the pixel intensity corresponding to the value associated with a given dimension. In a 40×40 pixel image, by this example, there would accordingly be 1600 dimensions.

Fisher's Linear Discriminant analysis (LDA) is a known method for identifying an appropriate separator between two or more classes of data. This separator may then be used to quickly classify new datasets. Where there are many dimensions, as in image content, LDA is useful as it facilitates dimensionality reduction. That is, all 1600 pixels of a 40×40 pixel image in the above example are unlikely to all be equally relevant for, say, recognizing a face. Given a first "training" dataset of classified images, LDA may be performed to identify those dimensions (i.e., pixels) most pertinent to characterizing the facial image. Subsequently, when a new dataset from a facial image needing to be identified is provided only these pertinent dimensions need be considered to quickly determine the proper categorization for the new data (i.e., as comprising a "face" or "no-face", or a particular individual's face).

Sparse Matrix Transform

The pseudo-code for the sparse matrix transform (SMT) is shown in FIG. 5. Certain embodiments contemplate incorporating the SMT into the calculation of $f(\lambda)$ to facilitate a more efficient bisection search. The SMT algorithm first initializes $S^{(0)}$ to the initial value of the matrix S 501. The system then iterates between values up to the SMT-model order r 502. For each iteration, the system identifies the argMax for the ratio 503. The system them determines the arctan largest ratio of off-diagonal to diagonal elements of sub-matrices $$\begin{pmatrix} s_{i,i}^{(m)} & s_{i,j}^{(m)} \\ s_{j,i}^{(m)} & s_{j,j}^{(m)} \end{pmatrix}$$

inside $S^{(m)}$ for the 504. At each iteration the Givens rotation $T^{(m)}$ 505 is determined and applied to the pending sparse matrix S to acquire the successive intermediate sparse matrix $S^{(m+1)}$. FIG. 6 is an illustration of a symmetric Givens rotation matrix. Once iterations have been performed up to the SMT-model order, the eigenvalues Er may then be assigned by multiplying the givens rotations 508. Similarly the eigenvalues may be determined by taking the diagonal 509. A more thorough explanation of these steps with regard to FIG. 8 is given below.

As recognized by one in the art, the classical eigenvalue decomposition problem can be written as SE=ED, where S is a real and symmetric matrix, E is an orthonormal matrix of eigenvectors, and D is a diagonal matrix of eigenvalues. The Jacobi eigenvalue algorithm may be used to solve the classical eigenvalue problem. The Jacobi eigenvalue algorithm iteratively transforms S into a diagonal matrix through a sequence of orthonormal transformations 606:

$$S^{(m+1)} = T^{(m)T} S^{(m)} T^{(m)} \quad (23)$$

where $S^{(0)} = S$ and $T^{(m)} := T(i_m, j_m, \theta_m)$ is a pairwise Givens rotation which differs from a unity matrix only in four elements: $t_{i_m,i_m} = t_{j_m,j_m} = \cos(\theta_m)$ and $t_{i_m,j_m} = -t_{j_m,i_m} = \sin(\theta_m)$. The eigenvector and eigenvalue matrices 608, 609, estimated after running r iterations of the Jacobi algorithm can be written as $$E^r = \prod_{m=1}^{r} T^{(m)} \text{ and } D^r = \text{diag}(E^{rT} S E^r) \quad (24)$$

where $$\prod_{m=1}^{r} T^{(m)} = T^{(0)}, T^{(1)}, \dots, T^{(r)}$$

in the limit when $r \to \infty$, $D^r \to D$.

The sparse matrix transform (SMT), is a Jacobi eigen decomposition that terminates early, i.e., the number of Givens rotations in Jacobi eigen decomposition is kept small: $r \ll N(N-1)/2$. As mentioned above, the variable r is sometimes referred to as the SMT-model order.

The sparsity of the eigen decomposition can be increased or decreased by varying the SMT-model order, r. The choice of appropriate Givens rotation $T(m) = T(i_m, j_m, \theta_m)$ at each iteration of SMT determines the accuracy of sparse eigen decomposition. To determine the optimal coordinate pair $(i_m, j_m)$, the SMT algorithm examines 2×2 sub-matrices $$\begin{pmatrix} s_{i,i}^{(m)} & s_{i,j}^{(m)} \\ s_{j,i}^{(m)} & s_{j,j}^{(m)} \end{pmatrix}$$

inside $S^{(m)}$ for the largest ratio of off-diagonal to diagonal elements (step 603 of FIG. 6):

$$(i_m, j_m) = \underset{(i,j)}{\text{argmax}} \frac{s_{i,j}^{(m)2}}{|s_{i,i}^{(m)}||s_{j,j}^{(m)}|} \quad (25)$$

The rotation angle $\theta_m$ is then selected so that the off-diagonal elements at $(i_m, j_m)$ and $(j_m, i_m)$ vanish in $S^{(m+1)}$ (step 504 of FIG. 5):

$$\theta_m = \frac{1}{2} \text{atan}(-2 s_{i_m,j_m}^{(m)}, s_{i_m,i_m}^{(m)} - s_{j_m,j_m}^{(m)}) \quad (26)$$

After the desired number of iterations, pursuant to the order number r, have been preformed, the sparse eigen decomposition may then be determined, based on (24), by (steps 508 and 509 of FIG. 5 respectively)

$$E^{r,\lambda} = \prod_{m=1}^{r} T^{\lambda(m)} \text{ and } D^{r,\lambda} = \text{diag}\big[E^{r,\lambda T}(S_b - \lambda S_t) E^{r,\lambda}\big] \quad (27)$$

Fisher Discrimination Method Incorporating the Sparse Matrix Transform

As discussed above, the SMT permits the sparsity of the estimated eigenvectors to be increased or decreased by varying r. The following section elaborates upon the incorporation of SMT into the bisection search algorithm of FIG. 4. Without loss of generality, let $d_0^{r,\lambda}$ be the largest eigenvalue of $(S_b - \lambda S_t)$ and $e_0^{r,\lambda}$ by the corresponding eigenvector.

Let the set $E_0^{r,\lambda}$ denote the collection of all SMT-estimated eigenvectors $e_0^{r,\lambda}$ for a fixed r and for $\lambda$ in the range [0, 1]. We propose to compute the sparse Fisher's linear discriminant vector, $\phi^*_F{}^\lambda$, as a solution to the following constrained optimization problem:

$$\phi^{*r}_F = \underset{\phi:\phi \in E_0^r}{\text{argmax}} \lambda_F(\phi) \text{ and } \lambda^{*r}_F = \lambda(\phi^{*r}_F) \quad (29)$$

Typically a smaller value of the SMT-model order, r, yields a sparser estimate of the discriminant vector, and vice versa. When r is large, sparsity constraints on the set $E_0^{r,\lambda}$ are relaxed, and sparse Fisher's LDA reduces to classical Fisher's LDA.

According to (29), the optimal sparse discriminant projection, $\phi^{*\lambda}_F$, is computed as an eigenvector $e_0^{r,\lambda}$ of $(S_b-\lambda S_t)$ for some in the range [0, 1]. In a manner analogous to the discussion above, it can be shown that the value of $\lambda$ that maximizes the discriminant criterion is $\phi_F(\phi)|_{\phi=e_0^{r,\lambda}}$ is also the value for which the eigenvalue $d_0^{r,\lambda}$ equals zero (See Appendix A).

Thus, if we let $f^r(\lambda):[0, 1] \to R$ represent the largest eigenvalue of $(S_b-\lambda S_t)$, estimated using an order-r SMT model, as a function of i.e.

$$f^r(\lambda) = e_0^{r,\lambda T}(S_b-\lambda S_t)e_0^{r,\lambda} = d_0^{r,\lambda} \qquad (30)$$

the constrained optimization problem in (21) can equivalently be solved as follows:

$$\lambda_F^{*r} = \{\lambda \in [0,1] : f^r(\lambda) = 0 \text{ for fixed } r\} \text{ and } \phi_F^{*r} = e_0^{r,\lambda_F^{*r}}. \qquad (31)$$

In the limit when $r \to \infty$, $f^r(\lambda) \to f(\lambda)$ and, therefore, $\lambda^{*r}_F \to \lambda^*_F$.

In certain embodiments, the function $f^r(\lambda)$ may be referred to as a "metric function" for the search algorithm LDA. Again, in a manner analogous to that discussed above, the function $f^r(\lambda)$ is bounded on [0, 1] and satisfies the following properties on the closed interval (See Appendix B):

$$\lambda \le \lambda^{*r}_F \Leftrightarrow f^r(\lambda) > 0 \qquad (32)$$

$$\lambda > \lambda^{*r}_F \Leftrightarrow f^r(\lambda) = 0 \qquad (33)$$

$$\lambda = \lambda^{*r}_F \Leftrightarrow f^r(\lambda) = 0 \qquad (34)$$

Therefore, the solution of the non-linear equation $f^r(\lambda) = 0$ can be computed by using the bisection method, as discussed earlier. An iterative strategy for estimating $\lambda^{*\lambda}_F$ and $\phi^{*\lambda}_F$ based on the bisection method is given in the algorithm of FIG. 8.

FIG. 8 is a generalized algorithm for iteratively driving the largest eigenvalue of $(S_b-\lambda S_t)$ to zero by subdivision incorporating the SMT transform methodology. This algorithm may be referred to as the "search algorithm" for LDA and the function $f(\lambda)$ as the "metric". Another classification program that employed PCA, for example, would similarly comprise the "search algorithm" PCA which identified eigenvalues using multiple iterations of a "metric". In both and similar cases, SMT may be used to optimize the computation of the eigenvalues. Steps 801-803, 806-812 of FIG. 8 correspond to steps 401-403, 406-412 of FIG. 4. However, the calculation of $f(\lambda)$ required for 804 and 805 is now optimized with use of the sparse matrix transform.

Thus, the algorithm estimates the optimal value of the sparse Fisher's discriminant criterion, $\lambda^{*r}_F$, as the root of the non-linear equation $f^r(\lambda)=0$. The root is estimated as the midpoint of a closed interval [a, b], where the initial values of a and b are 0 and 1, respectively, and then updated iteratively until the gap between a and b reduces to $2^{-K}$. The final values of $\lambda^{*r}_F$ and $\phi^{*r}_F$ are then calculated as $\lambda^{*r}_F = \lambda^{(K)}$ and $\phi^{*r}_F = e_F^{\lambda^{(K)}}$, where $\lambda^{(k)}$ denotes the midpoint of a and b in the k-th iteration and K denotes the total number of iterations for which the root-finding algorithm is run. Every time $\lambda^{(k)}$ is updated, $f^r(\lambda^{(K)}) = 0$ is computed by performing SMT-decomposition of $(S_b-\lambda^{(k)}S_t)$ for the new value of $\lambda^{(k)}$. Again, although this particular bisection algorithm has been provided for purposes of illustration, one will readily recognize numerous variations to this particular example. For example, the parameters a and b may be substituted with more refined intermediate search variables, and the iterations performed may be determined based on additional factors than simply K.

Similarly, the order r may vary across iterations and depend on a plurality of unspecified parameters pertinent to the domain in which the algorithm is performed, such as the conditions under which a user is attempting facial recognition training on a mobile device.

Demonstrative Applications

The following tables and figures provide various results for certain experimental demonstrations of the above algorithms. For the purposes of these examples, a plurality of 20×20 patches representing faces and non-faces, were used (class $\omega_1$ comprising faces and class $\omega_2$ comprising non-faces). For simplicity, class $\omega_1$ may be referred to as the "positive" class and $\omega_2$ as the "negative" class. The 20×20 patches are demeaned, variance normalized, and arranged as 400-dimensional vectors. For training, 2000 samples from $\omega 1$ and 51000 samples from $\omega 2$ were used. For testing, the number of samples used from $\omega 1$ is 1400 and from $\omega 2$ is 34000. The training data vectors from the face and non-face classes are used to compute the between-class and within-class scatter matrices, $S_b$ and $S_t$, respectively. The optimal Fisher's discriminant criterion $\lambda^*_F$ and the discriminant vector $\lambda^*_F$ were computed using the algorithm of FIG. 4. Similarly, $\lambda^{*r}_F$ and $\phi^{*r}_F$ were calculated using the algorithm of FIG. 8. The faces used in these experiments comprise frontal, upright faces. That is, the allowable range for both head roll and out-of-plane side-ways rotation is −15 to 15 degrees.

Figure 9A:
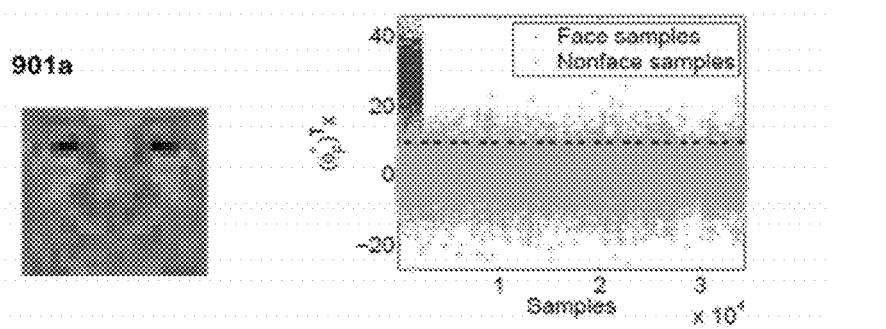
FIGS. 9A-C illustrate the results for faces vs. non-faces classification and the corresponding linear discriminants for the Optimal Fisher's linear discriminant, the thresholded Fisher's discriminant, and the SMT optimized Fisher's discriminant, respectively.
Figure 9B:
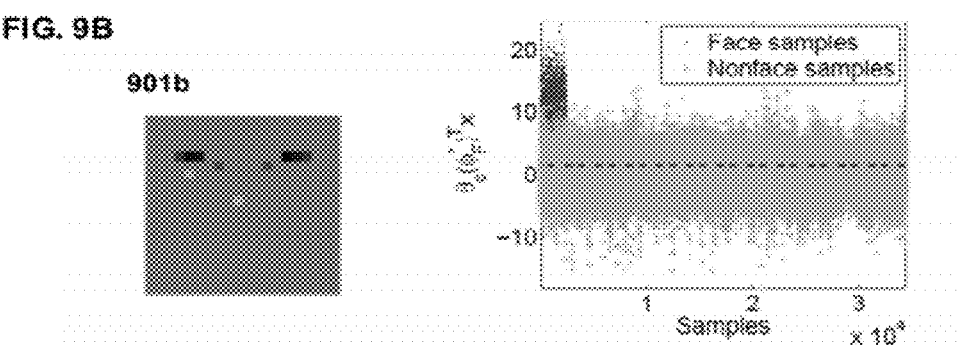
Figure 9C:
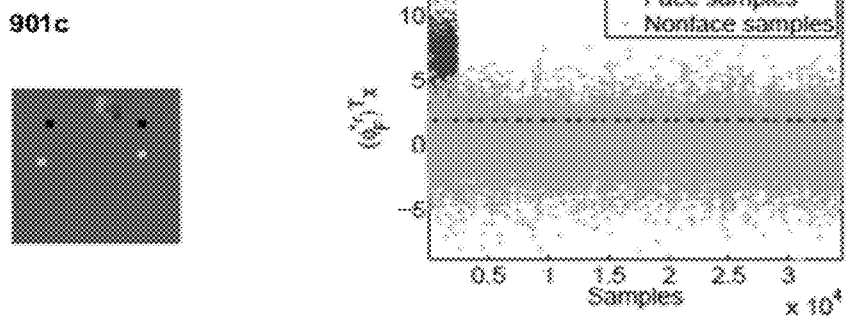

FIGS. 9A-C illustrate the results 902a-c for faces vs. non-faces classification and the corresponding linear discriminants 901a-c for the Optimal Fisher's linear discriminant FIG. 9A, the thresholded Fisher's discriminant FIG. 9B, and the SMT optimized Fisher's discriminant FIG. 9C, respectively. As compared to the linear discriminants 901a and 901b the linear discriminant 901c for the SMT optimized discriminant comprises fewer dimensions.

With regard to FIG. 9A, the optimized discriminant vectors 0, represented by 901a, was used to classify a test vector x from either class $w_1$ or $w_2$ discussed above according to the following rule:

$$x \in \begin{cases} w_1 & \text{if } \phi_F^{*T} x \ge T \\ w_2 & \text{if } \phi_F^{*T} x < T \end{cases} \qquad (35)$$

where the threshold T is adjusted to give the desired classification rate.

With regard to FIG. 9B, a thresholded version of the tests were run. For N-dimensional data, computation of a Fisher's projection requires N multiplications and N−1 additions. When N is large, the required computation can be substantial, making a software implementation of the classification scheme slow, and a hardware implementation of the scheme costly. A simple strategy that allows us to control the trade-off between classification accuracy and computation is to hard-threshold components of $\phi^{*r}_F$, leaving only those having a magnitude larger than or equal to a threshold. The results of these tests are indicated in FIG. 9B and used the rule:

$$\theta_c(\phi^*_{F,i}) \in \begin{cases} \phi^*_{F,i} & \text{if } |\phi^*_{F,i}| \ge c \\ 0 & \text{if } |\phi^*_{F,i}| < c \end{cases} \qquad (36)$$

where $\theta_c$ denotes the hard-thresholding function and the constant c controls the sparsity of the thresholded discriminant vector $\theta_c(\phi^*_F)$.

To trade-off classification accuracy for lower computation, we choose a value of c to get a thresholded discriminant vector, $\theta_c(\phi^*_F)$, with only 10 non-zero components, as shown in FIG. 3(a). The computation of the dot product $\phi_c(\phi^*_F)^T x$ now requires only 10 multiplications and 9 additions. However, the reduction in computation, comes at the cost of a significant deterioration in classification performance, as shown in 1102b. For a fixed positive detection rate of 99%, the false positive rate with the sparse projection vector, $\theta_c(\phi^*_F)$ rises to 40.7%.

The classification of face and non-face test samples using the rule. The blue broken line in each of FIGS. 11A-C represents the value of T in (35).

TABLE 1

| No. of non-zero components in $\theta_c (\phi_F^*)$ | False positive rate % |
|---|---|
| 20 | 0.80 |
| 40 | 0.82 |
| 100 | 0.82 |
| 120 | 0.85 |
| 200 | 0.82 |
| 260 | 0.85 |
| 320 | 0.86 |
| 350 | 0.84 |
| 400 | 0.88 |

Table 1 depicts the classification accuracy as a function of sparsity of the thresholded discriminant $\theta_c(\phi^*_F)$. The positive detection is fixed at 99%.

With regard to FIG. 9C, tests were also performed using the Sparse Matrix Transform Implementation of the Fisher Discrimination method described above. The training data vectors from the two classes $w_1$, $w_2$, were used to compute the scatter matrices $S_b$ and $S_t$. The sparse discriminant directions, $\phi^{*r}_F$, and optimal values of the sparse discriminant criterion, $\phi^{*r}_F$, were then estimated by solving the non-linear equation 805. For performing sparse Fisher's linear discriminant analysis, the number of Givens rotations, r, in the SMT model was fixed. The maximum number of iterations, K, for which the root-finding bisection method is run was also fixed; specifically K=20 was used. The estimated values of $\lambda^{(k)}$ and $|f'(\lambda^{(k)})|$ as a function of the iteration number k of the algorithm, when r is fixed at 260, are shown in plots 1002C and 1002D, respectively, below. The optimal value of the sparse discriminant criterion was estimated as $\lambda^{*r}_F|_{r=260} = \lambda^{(K)}|_{K=20} = 0.85$, which is smaller than the optimal value of the classical Fisher's discriminant criterion, $\lambda^{*F} = 0.906$, estimated for traditional FDA. The corresponding sparse discriminant vector was determined as $$\phi^{*260}_F = e_0^{\lambda^{*260}_F}.$$

The sparse projection vector $\phi^{*260}_F$ was arranged as a 20×20 mask 901c.

This projection vector has only 11 non-zero components; hence the computation involved in projecting a test vector x onto the space of $\phi^{*260}_F$ is only 11 multiplications and 10 additions. The data classification performance with $\phi^{*260}_F$ as the discriminant direction is shown in 902c. The threshold T was adjusted to give a positive detection rate of 99%; the false positive rate achieved was 16.7%. For comparison, for a similar computational burden and positive detection rate, the hard-thresholded Fisher's feature $\theta_c(\phi^*_F)$ 902b, yields a false positive rate of 42.0%

Figure 10:
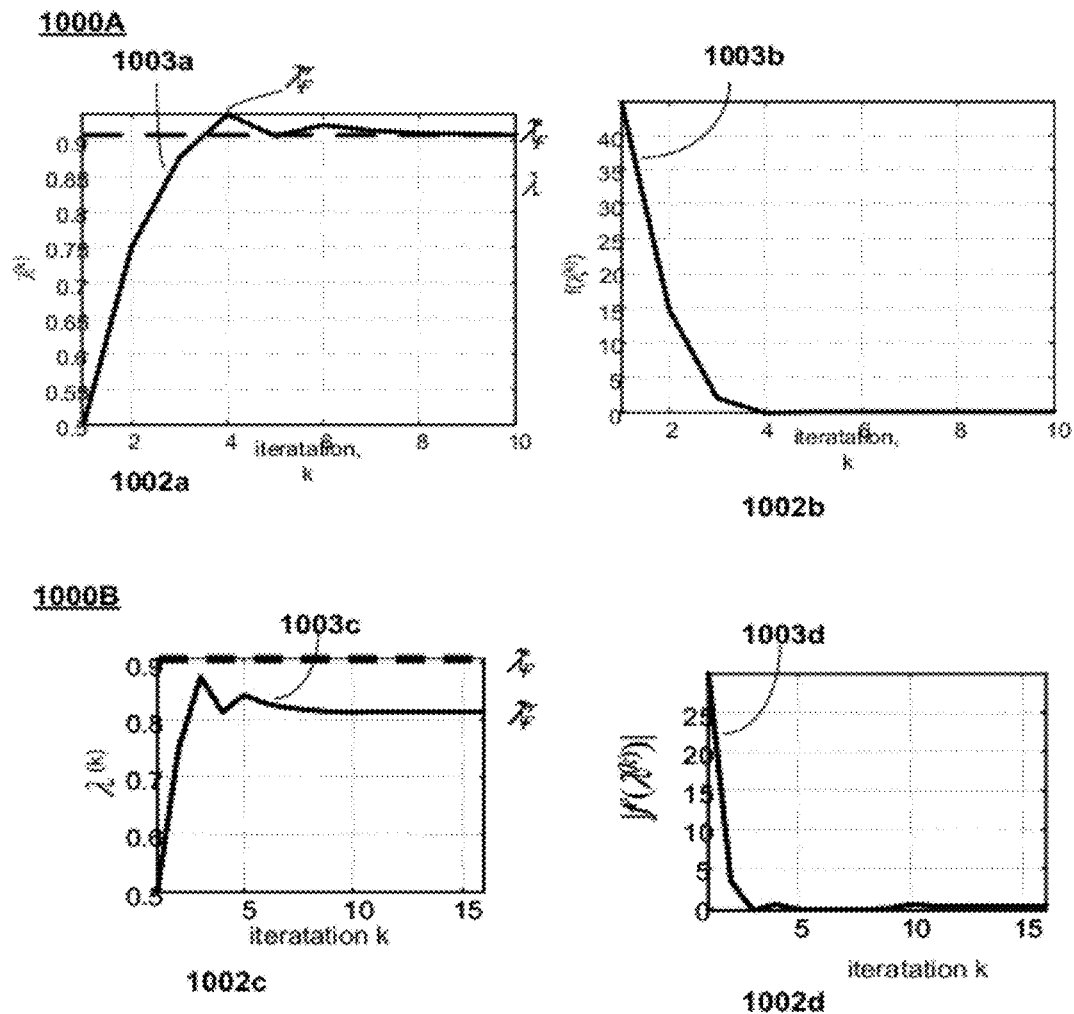
FIG. 10 is a plot of $\lambda^{(k)}$ vs k iterations and $|f'(\lambda^{(k)})|$ vs k iterations for the faces vs. non-faces classification problem using the algorithm of FIG. 5 and for the algorithm of FIG. 8 where r is fixed at 260.

FIG. 10 illustrates plots of $\lambda^{(k)}$ vs k iterations and $|f'(\lambda^{(k)})|$ vs k iterations for the faces vs. non-faces classification problem using the algorithm of FIG. 5 and for the algorithm of FIG. 8 where r was fixed at 260. Particularly, the pair 1000A of plots 1002a and 1002b respectively illustrate the anticipated value of $\lambda^{(k)}$ 1003a and $|f'(\lambda^{(k)})|$ 1003b for successive iterations of k using the algorithm of FIG. 5. Similarly, the pair 1000B of plots 1002c and 1002d respectively illustrate the anticipated value of $\lambda^{(k)}$ 1003c and $|f'(\lambda^{(k)})|$ 1003d for successive iterations of k using the algorithm of FIG. 8. For larger iterations, the algorithm of FIG. 5 the value of λ converges to 0.906 for $\lambda_F^*$ whereas for the algorithm of FIG. 8 the value of λ converges to 0.85 for $\lambda_F^{*r}$.

Generally speaking, a larger value of λ implies better class separability. The eigen vector corresponding to $\lambda_F^*$ may be dense, i.e. computationally inefficient, but may deliver higher classification accuracy. On the other hand, the eigen vector corresponding to $\lambda_F^{*r}$ is sparse, i.e. computationally efficient, but delivers lower classification accuracy. Thus, embodiments of the algorithm facilitate a tradeoff between classification accuracy and computational efficiency. Sparsity is generally larger for lower values of r, and Applicant has accordingly performed tests (described herein) to facilitate identification of the appropriate value of r.

Figure 11:
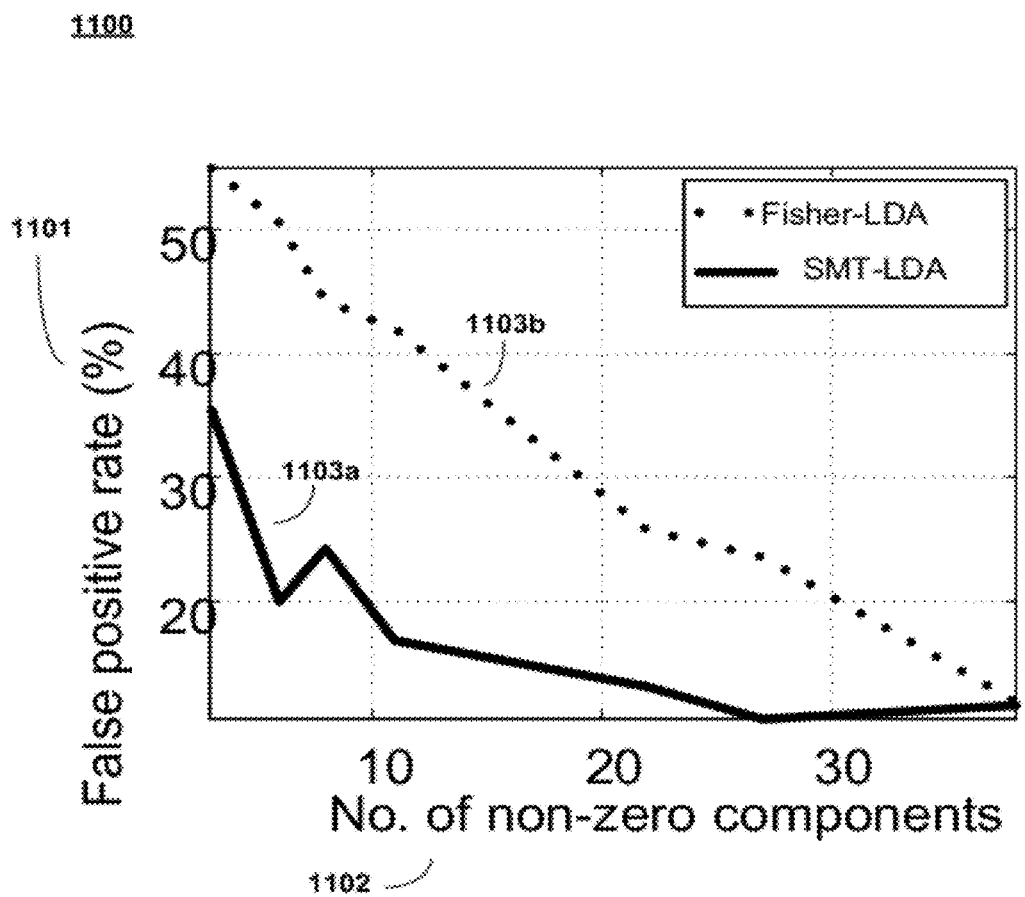
FIG. 11 is a comparative plot of the performance of traditional Fisher-LDA vs. SMT-LDA for distinguishing between facial and non-facial data (i.e., images containing a human face and images not containing a human face).

FIG. 11 illustrates the relative classification performance of traditional Fisher-LDA 1103b vs. SMT-LDA 1103a for faces vs. non-faces test data. Again, the false-positive rate for both methods is fixed at 99%. The horizontal axis shows the sparsity of the discriminant feature vectors $\theta_c(\phi^*_F)$ or $\phi^{*r}_F$. As indicated, the SMT implementation demonstrated a significantly lower number of false-positives 1101 than the traditional FDA approach for every number of non-zero components 1102.

Figure 12:
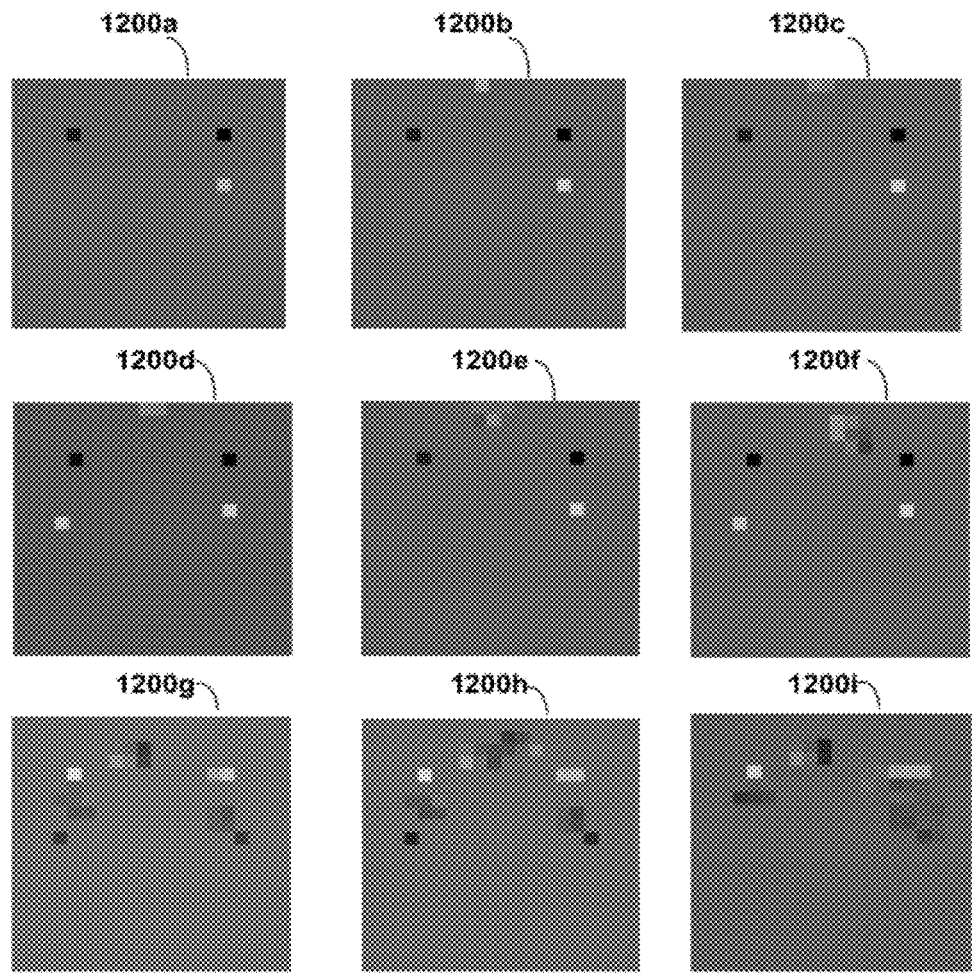
FIG. 12 is a plot of the Sparse Fisher's Discriminant projections obtained for r=20, 40, 100, 120, 200, 260, 320, 350, and 400 respectively.
Figure 13:
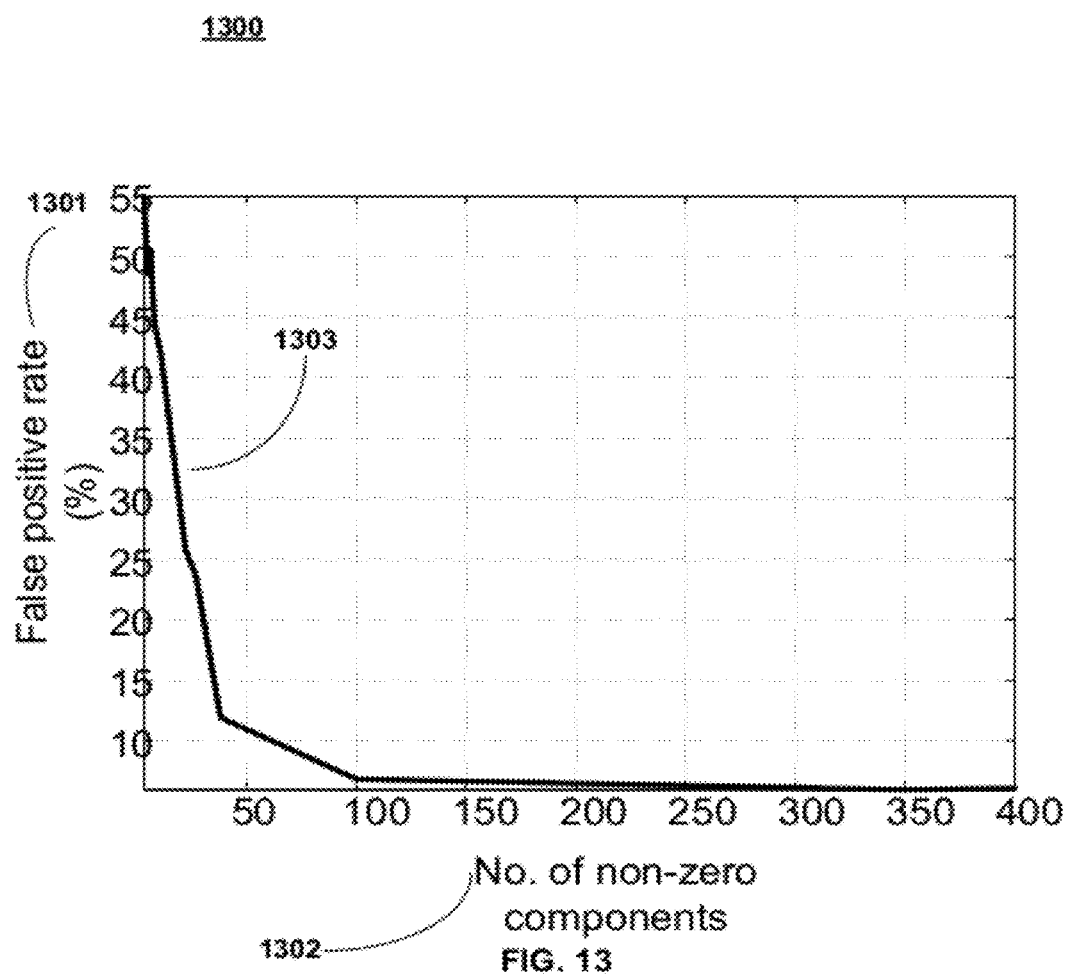
FIG. 13 is a plot of classification accuracy versus sparsity using a particular embodiment.

FIG. 12 illustrates discriminant projections $\phi^{*r}_F$, optimized using different values of r in the proposed sparse matrix LDA framework; specifically, the values r=20, 40, 100, 120, 200, 260, 320, 350, and 400 were chosen (FIGS. 1200A-I respectively). The number of non-zero components in each discriminant vector $\phi^{*r}_F$ and the corresponding value of the discriminant criterion $\lambda^{*r}_F$ are shown in Table 2 below. With an increase in the SMT-model order, r, sparsity of projection F decreases, while the value of $\lambda^{*r}_F$ increases (generally), indicating an improvement in class separability.

TABLE 2

| SMT-model order, r | $\lambda_F^{*r}$ | No. of non-zero components in $\phi_F^{*r}$ |
|---|---|---|
| 20 | 0.80 | 3 |
| 40 | 0.82 | 4 |
| 100 | 0.82 | 5 |
| 120 | 0.85 | 6 |
| 200 | 0.82 | 8 |
| 260 | 0.85 | 11 |
| 320 | 0.86 | 22 |
| 350 | 0.84 | 27 |
| 400 | 0.88 | 38 |

Table 2 indicates the optimal value of the sparse discriminant criterion, $\lambda^{*r}_F$, and sparsity of the discriminant projection, $\phi^{*r}_F$, as a function of the SMT-model order, r as applied to a particular set of face vs. non-facial recognition data.

TABLE 3

| No. of non-zero components in discriminant vector | Fisher-LDA False Positive Rate % | SMT-LDA False Positive Rate % |
|---|---|---|
| 3 | 55.0 | 35.4 (r = 20) |
| 6 | 40.6 | 20.0 (r = 120) |
| 8 | 44.2 | 24.3 (r = 200) |
| 11 | 42.0 | 16.8 (r = 260) |
| 22 | 25.8 | 13.2 (r = 320) |
| 27 | 23.6 | 10.6 (r = 350) |
| 38 | 11.9 | 11.6 (r = 400) |
| 350 | 6.0 | 5.4 (r = 480) |

Table 3 provides a comparison of the classification performance of traditional Fisher-LDA vs. SMT-LDA on a face/non-face dataset. The face detection rate is kept fixed at 99%. Generally, there exists a tradeoff between a positive detection rate and false positives. Parameters producing a higher positive detection rate also tend to produce more false positives, and vice versa. Optimal face detection algorithm parameters found 95% or higher faces in a given sequence of images, while preventing non-face regions being labeled as face regions. The number of multiplications required to compute the dot product in equation (35), i.e., $(\phi^*_F{}^r)^T x$, equals the number of non-zero components in a discriminant feature vector $\theta_C(\phi^*_F)$ or $\phi^*_F{}^r$.

These experimental results demonstrate that the proposed applications of the Sparse Matrix Transform provides an excellent framework for controlling the trade-off between accuracy of classification and computational complexity of the classification algorithm.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

APPENDIX-A

This appendix demonstrates the claim made above that the solution to the constrained optimization problem in (29) can equivalently be found by solving the problem in (31).

From (29), since $$\lambda_F^* = \max_{\phi:\phi \in E_0^r} \frac{\varphi^T S_b \varphi}{\varphi^T S_t \varphi} = \frac{\varphi_F^{*rT} S_b \varphi_F^{*r}}{\varphi_F^{*rT} S_t \varphi_F^{*r}} \qquad (35)$$

Therefore $$\phi^*_F{}^{rT}(S_b - \lambda^*_F{}^r S_t)\phi^*_F{}^r = 0 \qquad (36)$$

If we select a vector $\phi \in E_0^r$ arbitrarily, then and since $S_t$ is positive-definite, $$\lambda_F^{*r} \geq \frac{\varphi^T S_b \varphi}{\varphi^T S_t \varphi}; \qquad (37)$$

And since $S_t$ is positive-definite:

$$\phi^T(S_b - \lambda_F^{*r} S_t)\phi \leq 0 \qquad (38)$$

Combining (36) and (38) we have $$\max_{\phi \in E_0^r} \phi^T(S_b - \lambda_F^{*r} S_t)\phi = 0; \qquad (39)$$

which means $$f^r(\lambda_F^*) = d_0^{r, \lambda_F^{*r}} = 0.$$

Thus we have $$\lambda = \lambda_F^{*r} \Rightarrow f(\lambda) = 0 \qquad (40)$$

Conversely, assume that $\lambda_0$ is some constant in the interval [0, 1] for which $$f^r(\lambda_0) = d_0^{r, \lambda_0} = 0 \qquad (41)$$

$$\Rightarrow \max_{\varphi \in E_0^r} \phi^T(S_b - \lambda_F^{*r} S_t)\phi = 0; \qquad (42)$$

$$\Rightarrow e_0^{r, \lambda_0^T}(S_b - \lambda_0 S_t) e_0^{r, \lambda_0} = 0; \qquad (43)$$

$$\therefore \lambda_0 = \frac{e_0^{\lambda_0^T} S_b e_0^{\lambda_0}}{e_0^{\lambda_0^T} S_t e_0^{\lambda_0}}; \qquad (44)$$

Also, for an arbitrary $\phi \in E_0^r$, we have $$\phi^T(S_b - \lambda_0 S_t)\phi \leq 0 \qquad (45)$$

$$\Rightarrow \lambda_0 \geq \frac{\phi^T S_b \phi}{\phi^T S_t \phi} \qquad (46)$$

Combining (44) and (46), $$\lambda_0 = \max_{\varphi \in E_0^r} \frac{\varphi^T S_b \varphi}{\varphi^T S_t \varphi} = \lambda_F^* \text{ and } \phi_F^{*r} = e_0^{r,\lambda_0} \quad (47)$$

Thus, we have $$\lambda_0 = \lambda^*{}_F^r \Leftarrow f(\lambda) = 0 \quad (48)$$

APPENDIX-B

In this appendix, we demonstrate the claims made above that the function $f_r(\lambda)$ on $\lambda \in [0,1]$, $$\lambda < \lambda^*{}_F^r \Leftrightarrow f(\lambda) > 0 \quad (49)$$

$$\lambda > \lambda^*{}_F^r \Leftrightarrow f(\lambda) = 0 \quad (50)$$

In this appendix, we prove only (49). Proof of (50) is similar. For an arbitrary $\lambda$ in the closed interval [0, 1] and a fixed r, first assume $$f(\lambda) > d_0^{r,\lambda} > 0 \quad (51)$$

$$\Rightarrow e_0^{r,\lambda T}(S_b - \lambda S_t) e_0^{r,\lambda} > 0 \quad (52)$$

Since $S_t$ is positive-definite, therefore $$\lambda_F^{*r} \geq \frac{e_0^{\lambda T} S_b e_0^{\lambda}}{e_0^{\lambda T} S_t e_0^{\lambda}} \geq \lambda \quad (53)$$

Thus we conclude $$f_r(\lambda) > 0 \Rightarrow \lambda < \lambda^*{}_F^r \quad (54)$$

Now, conversely, suppose we arbitrarily select a $\lambda \in [0, 1]$ such that $\lambda < \lambda^*{}_F^r$.

$$\because \lambda < \lambda_F^{*r} = \frac{\phi_F^{*r T} S_b \phi_F^{*r}}{\phi_F^{*r T} S_t \phi_F^{*r}} \quad (55)$$

$$\therefore \phi_F^{*r T}(S_b - \lambda S_t) \phi_F^{*r} > 0 \quad (56)$$

Since $\phi^*{}_F^r \in E_0^r$, therefore $$\max_{\phi : \phi \in E_0^r} \varphi^T (S_b - \lambda S_t) \phi > 0 \quad (57)$$

$$\Rightarrow e_0^{r,\lambda T}(S_b - \lambda S_t) e_0^{r,\lambda} > 0 \quad (58)$$

From above, we conclude $$f(\lambda) > 0 \Leftarrow \lambda < \lambda^*{}_F^r. \quad (59)$$

What is claimed is:

1. A method, implemented on an electronic device, for generating physical sensor data classifiers, the method comprising:
    receiving a plurality of physical sensor data;
    identifying a projection vector, comprising:
        using a search algorithm comprising a metric function to identify correlated data represented by a sub-matrix of the plurality of sensor data, and
        calculating one or more eigenvalues associated with the metric function at least in part by transforming the plurality of physical sensor data using a sparse matrix transform (SMT),
    wherein transforming using the SMT comprises reducing off-diagonal elements of the sub-matrix, wherein the off-diagonal elements represent a level of correlation of the correlated data; and
    producing physical sensor data classifiers by projecting at least a portion of the physical sensor data upon the projection vector.

2. The method of claim 1, wherein the physical sensor data comprises one of facial image data, speech audio data, wireless communication signals, or laser range-finder data.

3. The method of claim 1, wherein the search algorithm is iteratively calculated.

4. The method of claim 1, wherein the metric function comprises the Fisher Discriminant.

5. The method of claim 1, wherein the search algorithm comprises a bijective search.

6. The method of claim 1, wherein using the search algorithm to identify correlated data comprises identifying a 2×2 sub-matrix and determining a ratio of off-diagonal elements to diagonal elements.

7. The method of claim 6, wherein reducing off-diagonal elements comprises choosing a rotation angle of the 2×2 matrix which reduces the off-diagonal elements of the 2×2 matrix to zero after at least one transformation using the SMT.

8. A mobile electronic device comprising:
    a memory, the memory configured to store a data set comprising physical sensor data;
    a processor configured to:
        receive a plurality of physical sensor data;
        identify a projection vector, wherein identifying comprises:
            using a search algorithm comprising a metric function to identify correlated data represented by a sub-matrix of the plurality of sensor data, and
            calculating one or more eigenvalues associated with the metric function at least in part by transforming the plurality of physical sensor data using a sparse matrix transform (SMT),
        wherein transforming using the SMT comprises reducing off-diagonal elements of the sub-matrix, wherein the off-diagonal elements represent a level of correlation of the correlated data; and
        produce physical sensor data classifiers by projecting at least a portion of the physical sensor data upon the projection vector.

9. The mobile electronic device of claim 8, wherein the physical sensor data comprises one of facial image data, speech audio data, wireless communication signals, or laser range-finder data.

10. The mobile electronic device of claim 8, wherein the search algorithm is iteratively calculated.

11. The mobile electronic device of claim 8, wherein the metric function comprises the Fisher Discriminant.

12. The mobile electronic device of claim 8, wherein the search algorithm comprises a bijective search.

13. A non-transitory, computer-readable medium, comprising instructions configured to cause a processor to implement a method to classify physical sensor data, the method comprising:
    receiving a plurality of physical sensor data;
    identifying a projection vector, comprising:
        using a search algorithm comprising a metric function to identify correlated data represented by a sub-matrix of the plurality of sensor data, and calculating one or more eigenvalues associated with the metric function at least in part by transforming the plurality of physical sensor data using a sparse matrix transform (SMT), wherein transforming using the SMT comprises reducing off-diagonal elements of the sub-matrix, wherein the off-diagonal elements represent a level of correlation of the correlated data; and producing physical sensor data classifiers by projecting at least a portion of the physical sensor data upon the projection vector.

14. The non-transitory, computer-readable medium of claim 13, wherein the physical sensor data comprises one of facial image data, speech audio data, wireless communication signals, or laser range-finder data.

15. The non-transitory, computer-readable medium of claim 13, wherein the search algorithm is iteratively calculated.

16. The non-transitory, computer-readable medium of claim 13, wherein the metric comprises the Fisher Discriminant.

17. The non-transitory, computer-readable medium of claim 13, wherein the search algorithm comprises a bijective search.

18. A mobile electronic device comprising:

means for receiving a plurality of physical sensor data;

means for identifying a projection vector, wherein identifying the projection vector comprises:

using a search algorithm comprising a metric function to identify correlated data represented by a sub-matrix of the plurality of sensor data, and calculating one or more eigenvalues associated with the metric function at least in part by transforming the plurality of physical sensor data using a sparse matrix transform (SMT), wherein transforming using the SMT comprises reducing off-diagonal elements of the sub-matrix, wherein the off-diagonal elements represent a level of correlation of the correlated data; and means for producing physical sensor data classifiers by projecting at least a portion of the physical sensor data upon the projection vector.

19. The mobile electronic device of claim 18, wherein the receiving means comprises a processor running software, the identifying means comprises a processor running software, the producing means comprises a processor running software.

20. The mobile electronic device of claim 18, wherein the physical sensor data comprises one of facial image data, speech audio data, wireless communication signals, or laser range-finder data.

21. The mobile electronic device of claim 18, wherein the search algorithm is iteratively calculated.

22. The mobile electronic device of claim 18, wherein the metric function comprises the Fisher Discriminant.

23. The mobile electronic device of claim 18, wherein the search algorithm comprises a bijective search.

* * * * *